United States Patent [19]
Hansen

[11] 3,716,158
[45] Feb. 13, 1973

[54] LOAD EQUALIZING SYSTEM FOR LIFT TRUCKS

[75] Inventor: Howard C. Hansen, Battle Creek, Mich.

[73] Assignee: Clark Equipment Company

[22] Filed: Nov. 11, 1971

[21] Appl. No.: 197,822

Related U.S. Application Data

[63] Continuation-in-part of Ser. No. 61,672, Aug. 6, 1970.

[52] U.S. Cl..................................214/730, 187/19
[51] Int. Cl. ..............................................B66f 9/14
[58] Field of Search ........214/730; 187/9, 19; 105/29

[56] References Cited

UNITED STATES PATENTS 3,232,455  2/1966  Fountain et al...................214/16.4 A
3,360,078  12/1967  Hopfeld....................................187/9

Primary Examiner—Drayton E. Hoffman
Assistant Examiner—Lawrence J. Oresky
Attorney—Marmaduke A. Hobbs et al.

[57] ABSTRACT

A load equalizing and stabilizing system for use with lift trucks having an upright and an attachment for handling laterally positioned loads, in which a pair of laterally spaced, vertically positioned racks are mounted on the upright on opposite sides of the center line thereof, and one or more horizontally positioned shafts extends between said racks and are journalled in the carriage and contain pinions mounted on the end thereof meshing with the racks. The pinions are mounted on the ends of the shaft in such a manner that they can tilt laterally to adjust to irregularities in the racks, this being preferably accomplished by a crowned spline structure interconnecting the shaft and pinion.

11 Claims, 4 Drawing Figures

PATENTED FEB 13 1973

*INVENTOR*
HOWARD C. HANSEN
BY Hobbs & Green
ATTORNEYS

PATENTED FEB 13 1973

INVENTOR
HOWARD C. HANSEN
BY Hobbs & Green
ATTORNEYS

LOAD EQUALIZING SYSTEM FOR LIFT TRUCKS

This application is a continuation-in-part of my copending application Ser. No. 61,672 filed Aug. 6, 1970.

Materials and products are often stored in warehouses, manufacturing plants, and shipping terminals in large storage rack structures spaced from one another by aisles used for transporting, depositing and retrieving loads of material or products in the rack structures on either side of the aisle. The loading and unloading of the racks involve the operations of moving the loads longitudinally in either direction along the aisle and moving the loads laterally into and from the racks on either side of the aisle. Sideloading devices require a reach mechanism capable of moving the load from a central carry position to a laterally extended position beyond the side of the vehicle. The minimum travel distance or stroke requirement of the mechanism is equal to the lateral dimension of the pallet and/or load, plus an additional several inches of aisle clearance required within the aisle between the traveling truck and the storage rack structure. Most mechanisms used in transporting loads do not lend themselves conveniently to this requirement. For instance, if a conventional pantograph mechanism is used for such long strokes, its collapsed height is so great as to severely limit the ability of the device to place loads in a top storage rack shelf near the ceiling. If a single stage telescoping arrangement is used for the large stroke required, the collapsed dimension of the telescope is much greater than the width of the truck, and a two-stage telescoping arrangement becomes excessively complex and costly. One known device employs a combination of two basic mechanisms, consisting of a single-stage telescope device and a pantograph mechanism, the first device achieving a portion of the stroke requirement and the pantograph mechanism extending to achieve the balance of the stroke. Such arrangements have been inherently unsatisfactory.

Further, in order to perform the two longitudinal and lateral operations with lift trucks, the aisles between the rack structures have been relatively wide to permit some lateral maneuvering of the trucks when a load is being deposited in or removed from the racks, thus limiting the amount of storage space available for any given area. The prior lift trucks also have not had the ability to handle loads on more than one side or to transfer a load from one side to the other, in addition to picking up and depositing a load straight ahead and directly on the floor, and have often been of limited capacity and required precise positioning of the truck and the use of special rack structures rather than conventional shelf type storage racks.

It is, therefore, one of the principal objects of the present invention to provide a side loading attachment for fork lift trucks which will enable the truck to handle full size pallet loads in relatively narrow aisles and perform the operations of loading and unloading directly ahead and on either side of the truck, and which will pick up and deposit loads and transfer them from one side to the other near floor level or in any elevated position.

Another object of the invention is to provide a fork lift truck attachment which can be mounted on a conventional lift truck with little or no substantial change in the structure or operating mechanism of the truck, and which is relatively simple in construction and design and capable of effectively utilizing standard, shelf-type rack structures.

Still another object of the invention is to provide a lift truck which is capable of handling loads to either side and in front without any lateral supporting means apart from the truck itself, and which will pick up a pallet load squarely and accurately without precise positioning of the truck and will move the load into and from the rack on a straight line at right angles to the longitudinal center line of the truck.

A further object is to provide a lift truck or the like with a mechanism which will skew pallet loads to either side of the truck and move the loads laterally to and from storage spaces, and which will retract laterally sufficiently to permit the truck to be moved in narrow aisles while the loads are held in their skewed positions, and also to skew the loads while the truck is in the aisle.

Another object of the invention is to provide, in a lift truck used for handling loads at either side thereof, a load stabilizing and equalizing system and mechanism which permits the carriage to move freely on the truck upright without binding of the upright structural parts or distortion of the tracks thereof and which is simple in construction and operation and can readily be installed on the upright without special or precise machining operations.

Additional objects and advantages of the invention will become apparent from the following description and accompanying drawings, wherein.

Figure 1:
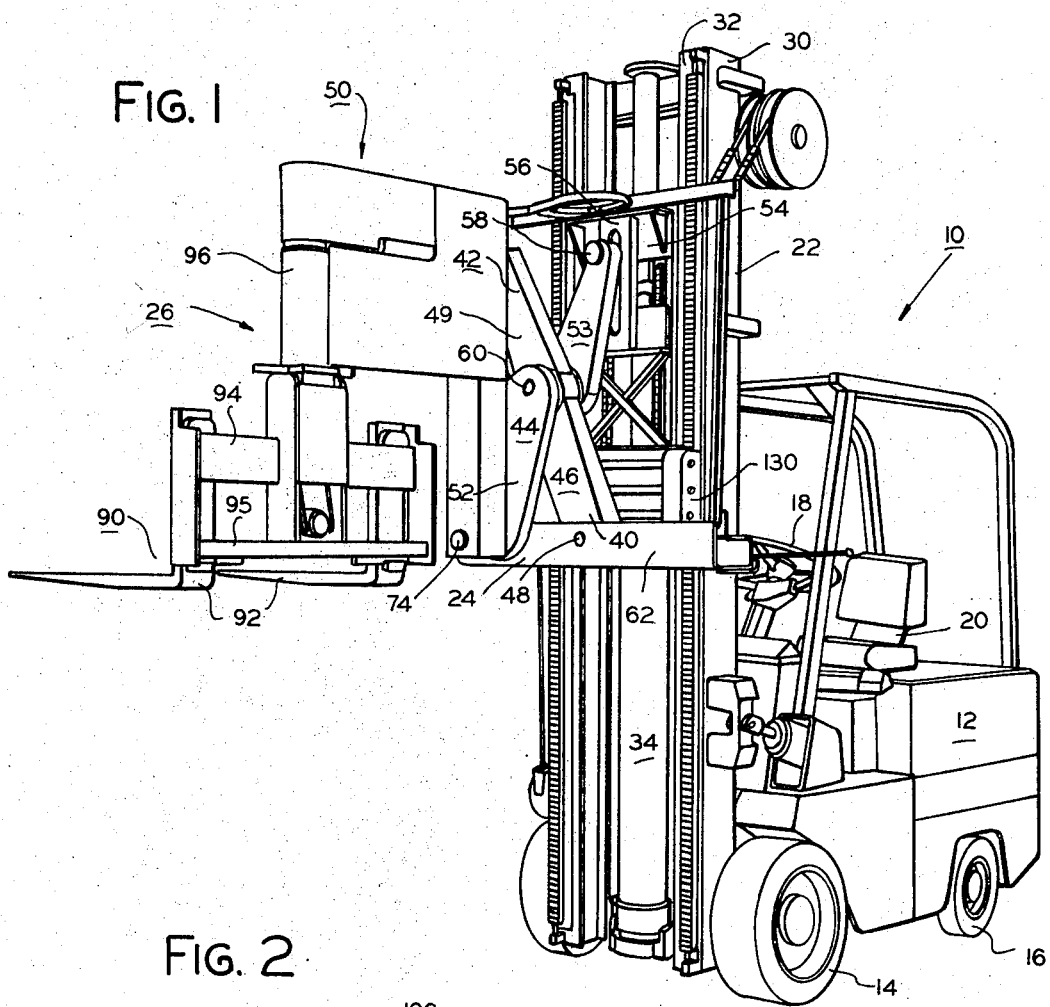
FIG. 1 is a perspective view of a lift truck having a side loader attachment thereon and including my load equalizing system and mechanism.
Figure 2:
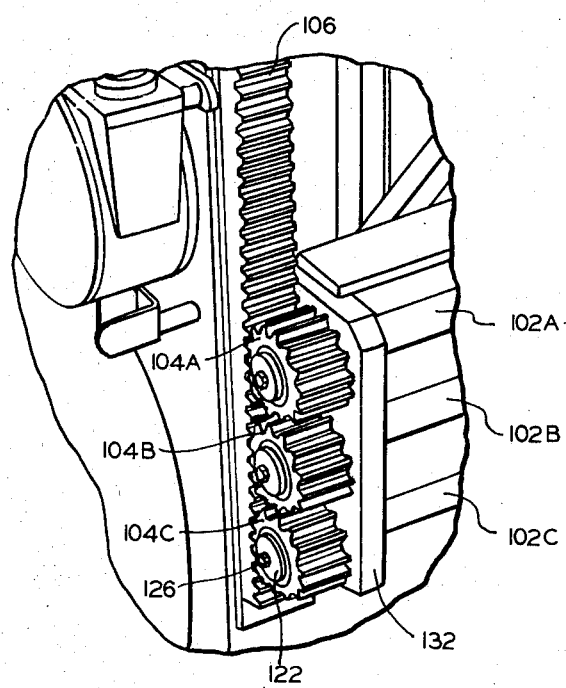
FIG. 2 is an enlarged fragmentary perspective view of my load equalizing mechanism.
Figure 4:
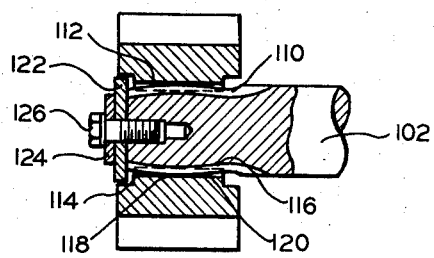
FIG. 4 is an axial cross-sectional view of a part of the load equalizing mechanism, the section being taken on line 4—4 of FIG. 3.

Referring more specifically to the drawings, and to FIG. 1 in particular, numeral 10 designates generally a lift truck having a body 12, front and rear wheels 14 and 16, steering wheel 18, seat 20, and an upright 22 on the front of the truck having mounted thereon a carriage 24 and a side loader attachment indicated generally by numeral 26. The lift truck shown in the drawings on which the present attachment may be used is considered conventional for the purpose of the present description, and may be of any one of a number of well known types, including those powered by a battery driven electric motor or by a gasoline engine. Hence the details of the lift truck will not be described in detail herein.

The upright 22 and the carriage 24 mounted on the front of the truck likewise may generally be considered conventional for the purpose of the present description, the one shown briefly consisting of an outer mast section 30 and inner mast section 32, telescopically arranged with respect to one another, and a hydraulic cylinder 34 for operating the inner mast section and the carriage mounted on the front of the upright. The inner and outer sections are each constructed of laterally spaced channel members and the upright shown in the drawings embodies a two stage lift system, although the present attachment can be used with other types of systems. The carriage 24 is mounted for vertical travel with respect to the rails of the inner section by conventional carriage rollers. Hydraulic fluid is transmitted to and from the upright and carriage and to and from the hydraulic actuating mechanisms on the attachment by a plurality of hydraulic hose (not shown) connected to the hydraulic system of the truck. The operating mechanisms of the upright and of the attachment are controlled from the operator's compartment by control valves in the hydraulic system.

The side loading attachment 26 includes a pantograph mechanism, indicated generally by numeral 40, consisting of links 42 and 44, link 42 having a lower arm 46, pivotally connected to the carriage by a shaft 48, and an upper arm 49 slidably connected to the rear end of a forwardly extending boom 50, and link 44 having a lower arm 52 pivotally connected to the rear end of the boom and an upper arm 53 slidably connected to a frame 54 having a track 56 therein to which the arm is connected by a shaft 58. Arms 52 and 53 of link 44 are connected rigidly to one another by a rotatable shaft 60, journalled in link 42 at the center thereof, the arms being secured to the opposite ends of the shaft, forming a rigid structure with the shaft so that the two arms move in unison along with the rotation of shaft 60. The links of the pantograph mechanism move outwardly from a vertical position at the center, where the two links 42 and 44 are substantially parallel to each other, to one of the two laterally extended positions such as illustrated in FIG. 1. The lower end of arm 46 of link 42 is pivotally connected to carriage member 62 by horizontally disposed shaft 48, and the upper end of arm 52 of link 44 is pivotally connected to the lower part of boom 50 by a horizontally disposed shaft 74, and the upper end of arm 53 is connected to track 56 by shaft 58. With the lower ends of links 42 and 44 pivoted on fixed shafts 48 and 74, respectively, and with the upper ends of the two links slidably connected to vertical tracks 56 and 78, respectively, the boom maintains a vertical position as the pantograph mechanism moves outwardly from its centrally located position to its extended position.

Operation of the pantograph mechanism 40 is accomplished by a hydraulic cylinder, and as the hydraulic cylinder is extended, the pantograph mechanism is extended to the operator's left, and as the hydraulic cylinder is contracted, the pantograph mechanism is first retracted to the center and then extended to the operator's right, the movement being to the same extent in both directions. The hydraulic cylinder is operated from the truck hydraulic system through flexible hydraulic lines (not shown) by controls located in the operator's compartment. This attachment, including the pantographic mechanism, is disclosed and claimed in pending application Ser. No. 77,846 (common assignee).

Figure 3:
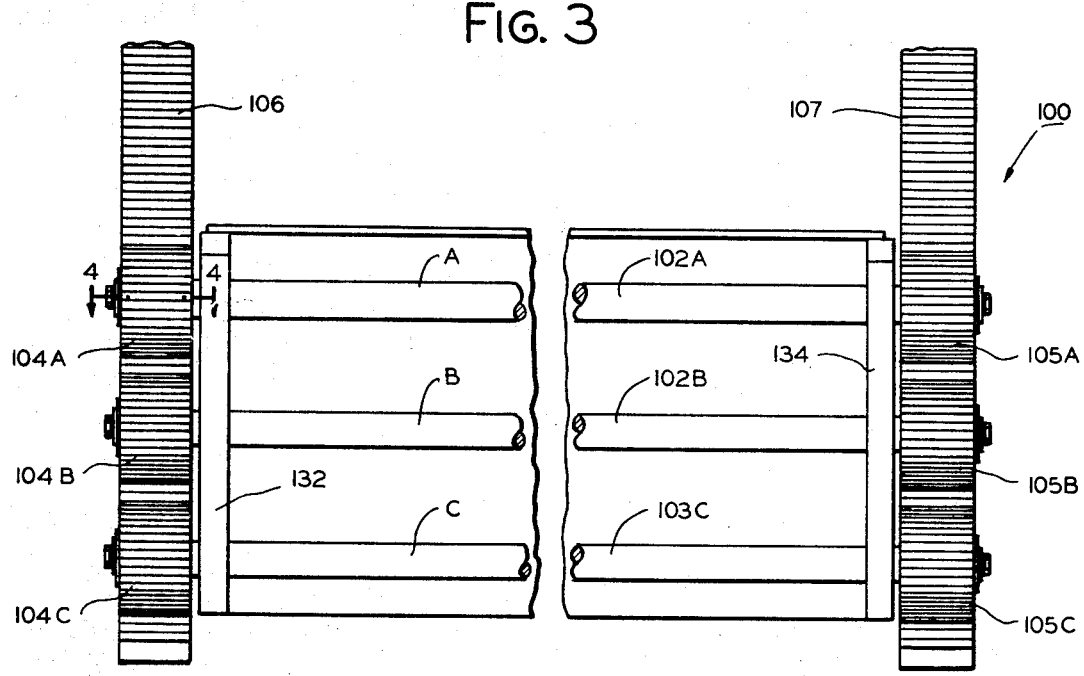
FIG. 3 is a front elevational view of the load equalizing system and mechanism shown in the preceding figures.

Frame 54, sliding on the innermost section, is movable with carriage 24 from the bottom to the top of the upright as the carriage and the attachment 26 are placed in the various vertical positions required for depositing and picking up loads. With the type of pantograph mechanism utilized in the present attachment, the load can be fully extended to the right hand lateral position illustrated in FIG. 1, fully retracted to the center position, and then extended laterally with the boom positioned on the left hand side and the load positioned directly in line with the truck. The same operation can be performed with the load on the left hand side of the truck. The load carrying boom 50 may be of various types of construction, the one illustrated being a fabricated type consisting of spaced panels welded to an inner framework to form a strong, rigid structure for carrying the load in the various extended positions described herein. Throughout the operation of the present attachment, the boom always remains in a forwardly extended position and moves laterally, while extending forwardly to any position between the far right and left positions illustrated in FIG. 3.

The fork section generally indicated by the numeral 90, includes two spaced tines 92 adjustably connected to upper and lower fork bars 94 and 95, which in turn are rigidly connected to a post 96 journalled in a bearing in the forward end of boom 50. This construction permits the fork mechanism to slew 180° between the right and left positions while the boom remains in its forward position.

Carriage 24 is mounted for vertical movement on upright 22 by a plurality of conventional carriage rollers, with the upright lift cylinder furnishing the power for lifting the load; however, a torque force of substantial magnitude exists when fork section 90 is in one of its lateral positions, such as that illustrated in FIG. 1. In order to obtain satisfactory performance of carriage 24 on upright 22, the torque force must be distributed or counteracted or counterbalanced to prevent an excessive strain on the upright and to facilitate easy movement of the carriage on the upright. In the embodiment of the invention illustrated in the drawings, the torque forces are transmitted equally to both sides of the outer section of the upright by a system of squaring bars or shafts and gears, indicated generally by numeral 100. Each squaring shaft includes a shaft 102, gears 104 and 105 mounted on opposite ends thereof, and racks 106 and 107 secured to and running the full length of the vertical members forming the outer section of the upright. The gears of each respective shaft A, B and C travel on the two racks 106 and 107 as the carriage is moved upwardly and downwardly on the upright carrying a lateral load, thus distributing the torque uniformly between the two sides of the upright. The use of the squaring shaft system, in combination with the fork lift upright frame, serves to rotate the opposing forces so that the forces are aligned and parallel to the upright members, which can then effectively withstand the torque resulting from a laterally offset load. While only three sets of shafts and gears (A, B and C) are shown in the drawings, a greater or smaller number of shafts and gears may be used as required.

Pinions 104 and 105 are mounted on the respective shafts 102 for non-rotation relative to the shafts, by a spline structure 110 in which the female spline 112 is essentially conventional i.e. consisting of a series of grooves and ridges spaced around center bore 114 of the pinion. The male spline 116 os if a special design in that it is machined with a crown 118 on the ribs 120 on the surface of the shaft end. The pinion is loosely held on the end of the respective shaft by a relatively large washer 122, a lock washer 124, and a screw 126 extending through the washers and threadedly received in axial bore 128 in the end of shaft 102. The pinions rotate in unison with the shaft and engage the respective racks 106 or 107, which are bolted or otherwise rigidly secured to the outer members of the truck upright. The crowned spline 110 permits the pinion to tilt sidewise in either direction and to adjust effectively to any irregularities in the rack, and thus avoid binding between the pinion and the rack and excessive wear of the gears on these two elements. The crowned spline may be of such a curvature that the gears may adjust laterally or wobble on the shaft by as much as 2° in either direction. The ability to adjust to the irregularities in the construction of the installed racks is particularly advantageous, in that in the normal construction of the upright, the frame is fabricated of hot rolled steel members welded together, and this type of structure often becomes slightly warped or bent, and the racks upon being bolted to the fabricated frame members are hence often slightly distorted. The crowned spline structure enables the pinions to align themselves with the gear track for good line contact between the pinion and the rack along the face of each tooth, thus minimizing the aforementioned binding and excessive wear, while equalizing and stabilizing the load between the lateral frame members of the upright as the load is moved laterally from the truck in either direction. The pinions are normally enclosed by a cover 130 bolted or otherwise secured to members 132 or 134 in which the shafts 102 A, B and C are journalled. It is seen that each shaft and pinion form essentially a rigid connection with respect to the torque between the carriage on which members 132 and 134 are mounted, and the lateral frame members of the upright and the pinions and crowned male spline form an adjustable connection with respect to lineal movement between the carriage and the upright, permitting the carriage to travel freely upwardly and downwardly on the upright regardless of any irregularities in the racks, while the load is being distributed and equalized between the lateral members of the upright.

In the operation of the front and lateral loading mechanism, starting with the carriage and attachment in their lowered position and the forks extending forwardly, the truck moves forwardly, inserting the forks beneath a load. The hydraulic mechanism in the upright then raises the carriage and attachment to a suitable carrying distance above the floor, and the load is transported to the location where it is to be deposited, for example on storage racks on either side of an aisle. Assuming for load is to be deposited on one of the upper shelves of the rack, the carriage is elevated by the upright to the level of the selected shelf, and the fork section is then slewed in the direction of the location where the load is to be deposited, and simultaneously the cylinder of pantograph mechanism 40 is operated to withdraw boom 50 in the opposite direction, thereby placing the fork section and load in the position illustrated on the right hand side. If the load is not now in proper position to be inserted onto the shelf, the truck can readily be driven forwardly and rearwardly in the aisle and the carriage can easily be manipulated upwardly and downwardly to obtain the desired position. When the proper position has been achieved, the hydraulic cylinder in the pantograph mechanism is then operated to advance the load laterally. As the mechanism operates, the load moves in a straight line laterally, thus permitting the operator to place the load precisely in the desired position. The load is then deposited on the shelf by lowering the carriage and tilting the tines of the fork section forwardly, and the fork is thereafter withdrawn from beneath the load by operating the pantograph mechanism from its extended position to the right, to its extended position to its left. While the tines are still in their lateral positions, the truck can easily maneuvered without interference from the unloaded attachment. The same sequency of operation is performed in depositing loads on the opposite sides of the aisle, and the operation is merely reversed to remove a load from a shelf or other load supporting structure. In the event the width of the aisle between shelve tiers is not sufficient to permit slewing of the load while the truck is in the aisle, the slewing is performed either before the truck enters or after it leaves the aisle.

While the foregoing operation is being performed, the load equalizing mechanism 100 constantly distributes the load equally on the upright between the two side members thereof on opposite sides of the center line, thus permitting the carriage to move freely up and down on the upright without the carriage rollers and frame bending and without distorting the structural members of the upright. The crowned spline permits the carriage to move freely regardless of irregularities in the upright structure or distortions in the racks secured thereto.

Only one embodiment of a load equalizing system for use with a front and side loader attachment has been described in detail herein; however, various changes and modifications may be made without departing from the scope of the invention.

I claim:

1. A load equalizing system for use with a lift truck having an upright, a carriage mounted on said upright and supporting an attachment for handling laterally positioned loads, said system comprising a pair of laterally spaced, vertically positioned racks mounted on said upright on opposite sides of the center line thereof, a horizontally positioned shaft between said racks journalled on said carriage, and pinions on the ends of said shaft meshing with said racks and means connecting said pinions to the respective ends of said shaft for rotation therewith and for tilting movement thereon, said tilting movement providing self-adjustment between said racks and said pinions during vertical movement of said carriage when said racks are misaligned relative to one another.

2. A load equalizing system for use with a lift truck having an upright, a carriage, and an attachment as defined in claim 1, in which a plurality of shafts and pinions interconnect said racks.

3. A load equalizing system for use with a lift truck having an upright, a carriage, and an attachment as defined in claim 2, in which a means connects said pinions to the respective ends of said shaft for rotation therewith for tilting movement thereon.

4. A load equalizing system for use with a lift truck having an upright, a carriage, and an attachment as defined in claim 1, in which said means consists of a spline having male and female parts, and in which one of said parts is crowned to permit the aforesaid tilting movement of said pinion on said shaft.

5. A load equalizing system for use with a lift truck having an upright, a carriage, and an attachment as defined in claim 3, in which said means consists of a spline having male and female parts, and in which one of said parts is crowned to permit the aforesaid tilting movement of said pinion on said shaft.

6. A load equalizing system for use with a lift truck having an upright, a carriage, and an attachment as defined in claim 4, in which said crowned spline is on the male part disposed on said shaft.

7. A load equalizing system for use with a lift truck having an upright, a carriage, and an attachment as defined in claim 5, in which said crowned spline is on the male part disposed on the shaft.

8. A load equalizing system for use with a lift truck having an upright, a carriage, and an attachment as defined in claim 1, in which said pinions are retained loosely on the respective ends of said shaft by a means consisting of a washer having a diameter larger than the internal bore of said pinion, and a screw extends through said washer and is threadedly received in an axial bore in said shaft.

9. A load equalizing system for use with a lift truck having an upright, a carriage, and an attachment as defined in claim 6 in which said pinions are retained loosely on the respective ends of said shaft by a means consisting of a washer having a diameter larger than the internal bore of said pinion, and a screw extends through said washer and is threadedly received in an axial bore in said shaft.

10. A load equalizing system for use with a lift truck having an upright, a carriage, and an attachment as defined in claim 1, in which a cover encloses said pinions and is attached to said carriage.

11. A load equalizing system for use with a lift truck having an upright, a carriage, and an attachment as defined in claim 2, in which a cover encloses said pinions and is attached to said carriage.

* * * * *